(12) United States Patent
Basista et al.

(10) Patent No.: US 8,689,544 B2
(45) Date of Patent: Apr. 8, 2014

(54) EMISSION CONTROL SYSTEM FOR A VEHICLE

(75) Inventors: Jeffrey S. Basista, Milford, MI (US); Philip A. Yaccarino, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 192 days.

(21) Appl. No.: 13/184,232

(22) Filed: Jul. 15, 2011

(65) Prior Publication Data

US 2013/0014492 A1 Jan. 17, 2013

(51) Int. Cl.
*F01N 3/00* (2006.01)

(52) U.S. Cl.
USPC .............................. 60/295; 60/274

(58) Field of Classification Search
USPC ......... 60/286, 295; 141/59, 82, 350; 220/86.2
See application file for complete search history.

(56) References Cited

U.S. PATENT DOCUMENTS

| | | | |
|---|---|---|---|
| 6,082,102 A | 7/2000 | Wissler et al. | |
| 6,928,806 B2 | 8/2005 | Tennison et al. | |
| 7,065,958 B2 | 6/2006 | Funk et al. | |
| 7,644,579 B2 | 1/2010 | Roberts et al. | |
| 7,743,605 B2 | 6/2010 | Katou et al. | |
| 7,937,933 B2 | 5/2011 | Doering et al. | |
| 2002/0189246 A1 | 12/2002 | Hepburn et al. | |
| 2003/0150507 A1* | 8/2003 | Channing | 141/9 |
| 2008/0138221 A1 | 6/2008 | Jochumsen et al. | |
| 2008/0202473 A1* | 8/2008 | Cook et al. | 123/478 |
| 2008/0210331 A1 | 9/2008 | Compere et al. | |
| 2009/0272440 A1* | 11/2009 | Levin | 137/59 |
| 2009/0301067 A1 | 12/2009 | Dingle et al. | |
| 2010/0050606 A1* | 3/2010 | Fulks et al. | 60/286 |
| 2010/0077740 A1 | 4/2010 | Basista et al. | |
| 2010/0095653 A1* | 4/2010 | Thiagarajan et al. | 60/286 |
| 2010/0200107 A1 | 8/2010 | Weathers et al. | |
| 2010/0275889 A1 | 11/2010 | Song | |
| 2010/0300076 A1 | 12/2010 | Maesse | |
| 2010/0319316 A1* | 12/2010 | Kasahara | 60/273 |
| 2011/0016853 A1 | 1/2011 | Tipton | |
| 2011/0120092 A1 | 5/2011 | Dentici | |
| 2012/0141331 A1* | 6/2012 | Floyd et al. | 422/168 |

* cited by examiner

*Primary Examiner* — Thomas Denion
*Assistant Examiner* — Mickey France
(74) *Attorney, Agent, or Firm* — Cantor Colburn LLP

(57) ABSTRACT

In accordance with an exemplary embodiment, an emission control system and method is provided for a vehicle. The system comprises a reductant reservoir having an intake pipe for receiving reductant and a heater for heating the reductant. A pump provides the heated reductant to an injector and also to a conduit extending into the intake pipe to provide heated reductant into the intake pipe to melt any frozen reductant in the intake pipe. The method comprises heating reductant stored within a reservoir of a vehicle emission control system, and pumping the heated reductant into an intake pipe of the reservoir to melt any frozen reductant in the intake pipe.

18 Claims, 2 Drawing Sheets

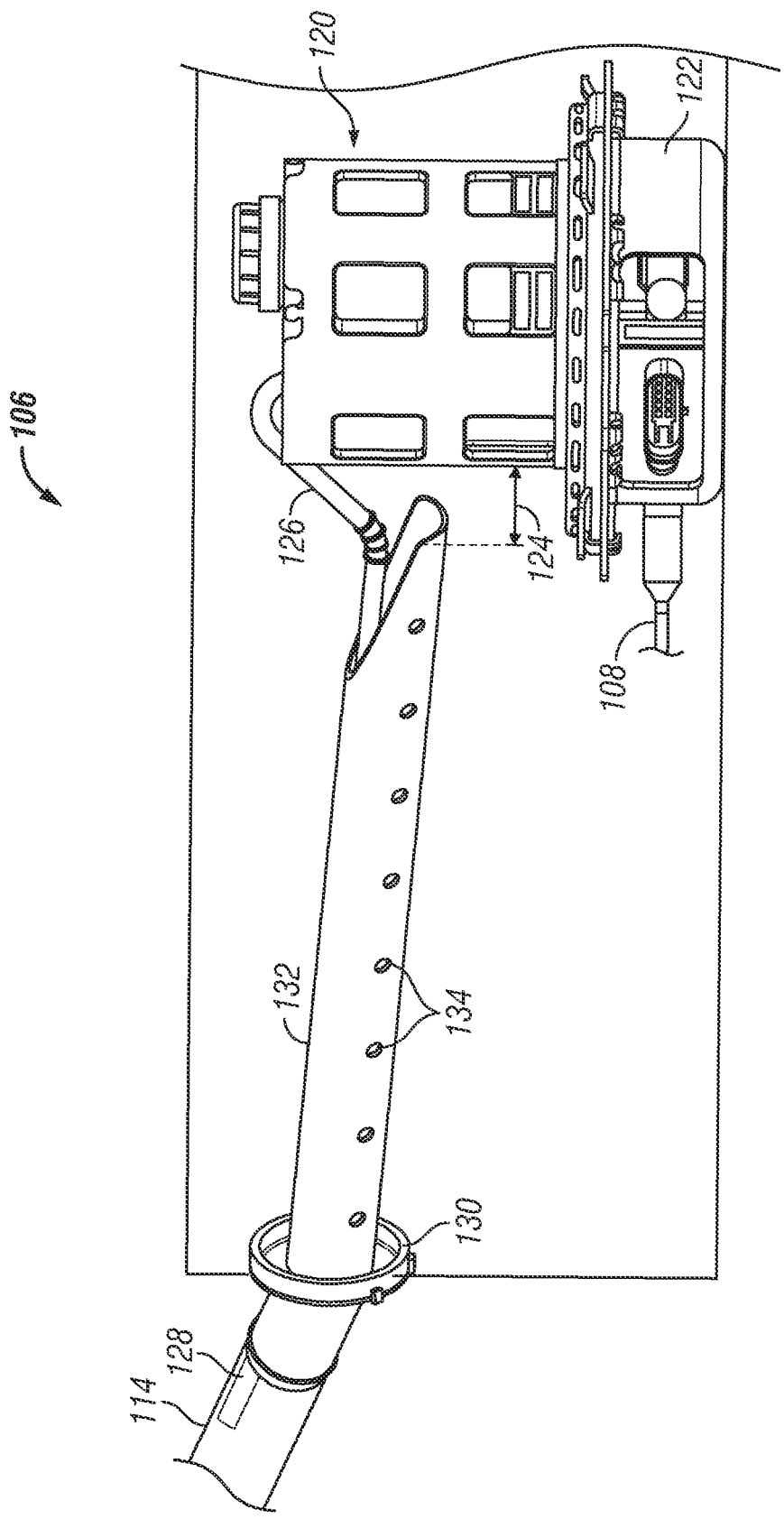

EMISSION CONTROL SYSTEM FOR A VEHICLE

TECHNICAL FIELD

The technical field generally relates to an emission control system for vehicles with diesel engines and, more particularly to an improved reductant storage system for the emission control system.

BACKGROUND

Current emission control regulations necessitate the use of catalysts in the exhaust systems of vehicles in order to convert regulated exhaust constituents such as carbon monoxide (CO), hydrocarbons (HC) and oxides of nitrogen ($NO_x$) into unregulated exhaust gas. Accordingly, vehicles with diesel-powered engines employ a process known as Selective Catalytic Reduction (SCR), in which nitrogen oxide ($NO_x$) vehicle emissions are ultimately reduced into nitrogen (N), water ($H_2O$) and carbon dioxide ($CO_2$). In the SCR process, a reductant (commonly referred to as "Diesel Emissions Fluid" or DEF) consisting of a solution of about 32.5 percent automotive-grade urea and purified water is sprayed as a mist into the high-temperature exhaust stream, where the reductant reacts under hydrolysis to produce ammonia ($NH_3$) and carbon dioxide ($CO_2$). Within an SCR catalytic converter, the $NO_x$ gases from the engine exhaust and the ammonia from the DEF are converted into nitrogen gas ($N_2$) and water vapor ($H_2O$).

Typically, the reductant is stored in a reductant reservoir (tank) in the vehicle and is delivered to an injector located in the exhaust system of the vehicle via fluid lines and a pump. Generally, the reductant has a freezing temperature in the range of 12 degrees Fahrenheit (−11 degrees Celsius), which may present challenges to the proper operation of the SCR system in cold weather.

Accordingly, SCR systems commonly include heating elements in a submersible pump module positioned within the reservoir to provided heated reductant to reduce the possibility of the reductant freezing in the fluid lines between the reservoir and the injector. However, the reductant is also known to freeze at the reservoir intake pipe (fill pipe), which can inhibit or prevent refilling of the reservoir until the frozen reductant melts. Low profile reductant reservoirs are particular susceptible to intake pipe freeze.

Accordingly, it is desirable to provide an emission control system for a vehicle having improved cold weather performance. Also, it is desirable to provide emission control system for a vehicle that resists reductant reservoir intake pipe freezing. Additionally, other desirable features and characteristics of the present invention will become apparent from the subsequent description taken in conjunction with the accompanying drawings and the foregoing technical field and background.

BRIEF SUMMARY

In accordance with an exemplary embodiment, an emission control system is provided for a vehicle. The system comprises a reductant reservoir having an intake pipe for receiving reductant and a heater for heating the reductant. A pump provides the heated reductant to an injector and also to a conduit extending into the intake pipe to provide heated reductant into the intake pipe to melt any frozen reductant in the intake pipe.

In accordance with an exemplary embodiment, an emission control method is provided for a vehicle. The method comprises heating reductant stored within a reservoir of a vehicle emission control system, and pumping the heated reductant into an intake pipe of the reservoir to melt any frozen reductant in the intake pipe.

DESCRIPTION OF THE DRAWINGS

The inventive subject matter will hereinafter be described in conjunction with the following drawing figures, wherein like numerals denote like elements, and:

FIG. 2 is an illustration of the reductant reservoir of the vehicle of FIG. 1.

DETAILED DESCRIPTION

Figure 1:
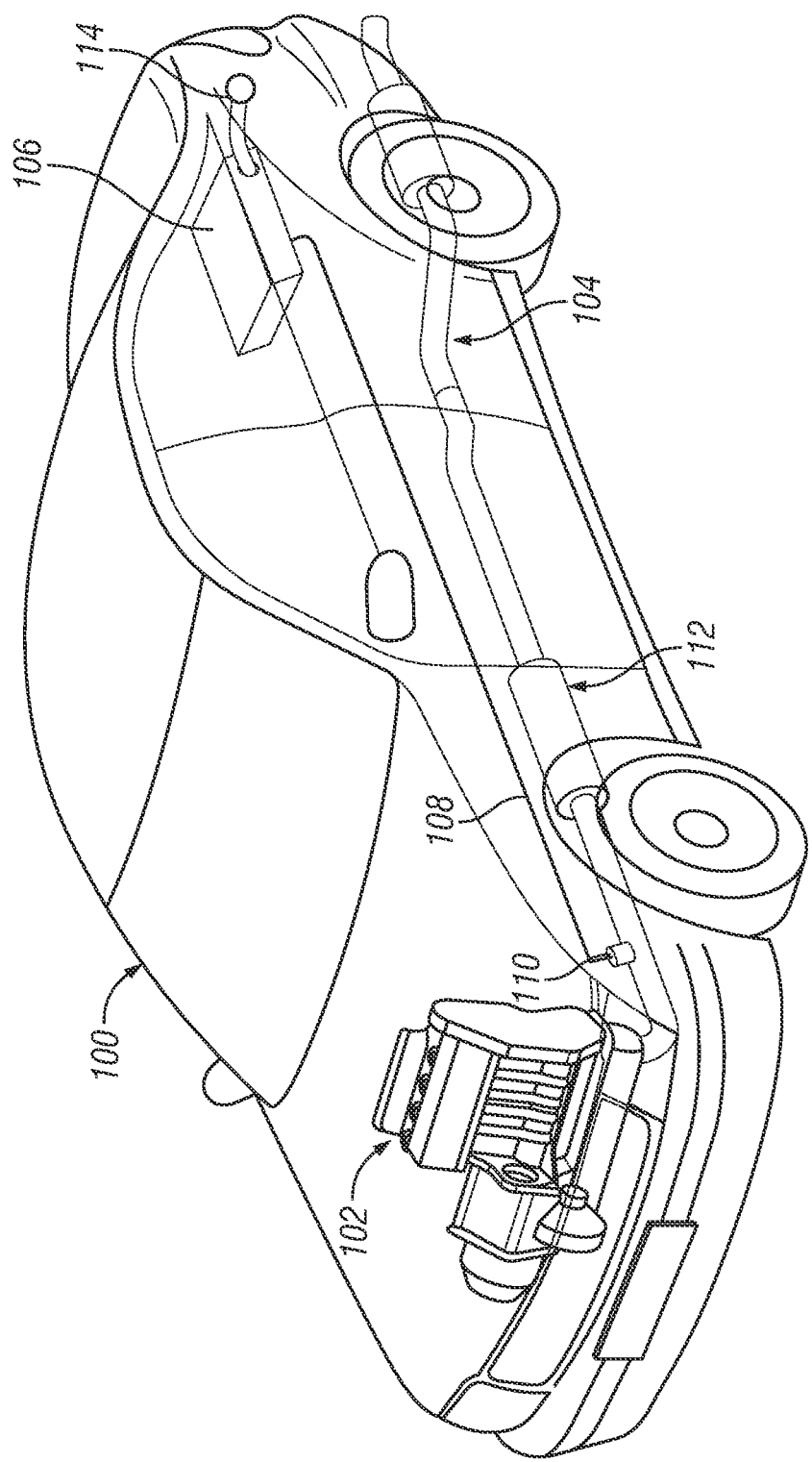
FIG. 1 is an illustration of a vehicle suitable for using exemplary embodiments of the present disclosure.

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-2 are merely illustrative and may not be drawn to scale.

FIG. 1 is a simplified illustration of an embodiment of a vehicle 100 according to the present disclosure. While FIG. 1 depicts various electrical and mechanical connections and couplings in a very simplified manner for ease of description, an actual embodiment of vehicle 100 will, of course, utilize additional physical components and devices that are well known in the automotive industry. For example, numerous conventional accessories would be included in a commercially available vehicle such as window or mirror defoggers, anti-lock brake systems, lighting systems, warning systems (e.g., horn), turn indicators (signals), air conditioning, heated seats, video/audio systems, and power outlet ports for user devices (collectively, accessories). Also, the vehicle 100 may be any one of a number of different types of vehicles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD).

As illustrated in FIG. 1, the vehicle 100 includes an internal combustion engine 102 (e.g., a diesel engine) coupled to an exhaust system 104. To reduce nitrogen oxide ($NO_x$) emissions, an emission control system includes a reductant reservoir (tank) 106, a reductant injector 110 coupled to the exhaust system 104 and an SCR catalyst 112 positioned in the exhaust system 104 downstream of the injector 110. The reductant reservoir 106 contains a reductant fluid (i.e., DEF) that is pumped though a fluid line 108 to the injector 110. The injector 110 sprays the reductant into the exhaust stream where the reductant reacts under hydrolysis to produce ammonia ($NH_3$) and carbon dioxide ($CO_2$), which are converted into nitrogen gas ($N_2$) and water vapor ($H_2O$) by the SCR catalyst 112. The reductant reservoir 106 includes a reservoir intake pipe 114 for convenient refilling of the reductant reservoir when needed. However, conventional arrangements of the reductant reservoir are known to freeze due to the reductant being approximately two-thirds water. Once frozen, the operator of the vehicle 100 is unable to refill the reservoir 106 until the frozen reductant melts and the intake pipe 114 clears. Typically, the engine 102 (and thus the vehicle 100) is permitted to operate without reductant, however, engine performance (e.g., horsepower and torque) is reduced until the emission control system is returned to proper operation when the reductant can be refilled.

FIG. 2 illustrates an exemplary embodiment of the reductant reservoir 106 according to the present disclosure, which includes a reductant pump assembly 120 having a heating element 122 that operates to warm the reductant during cold weather operation of the vehicle (100 in FIG. 1). As previously mentioned, the heated reductant is provided via a fluid line 108 to an injector 100 of the emission control system (See, FIG. 1). Optionally, the reductant pump assembly 120 includes a nozzle arrangement that provides a localized reductant melting zone 124 (approximately 50 mm), such as described in U.S. Patent Publication No. 2010/0077740, which is incorporated herein by reference.

According to embodiments of the present disclosure, the reductant pump assembly 120 includes a conduit 126 that extends into the intake pipe 114. An end 128 of the conduit 126 is positioned in the intake pipe 114 above the reductant entry point 130 of the reservoir 106, and delivers heated reductant into the intake pipe 114 that flows (via gravity) back into the reservoir 106. The heated reductant melts any frozen reductant blocking the reductant entry point 130 reducing or eliminating the intake pipe freezing problem of conventional reductant reservoirs. In some embodiments, the intake pipe 114 includes a portion 132 that extends into the reservoir 106. The intake pipe portion 132 has perforations 134 that facilitates flow of the reductant into the reservoir regardless of where the reductant freeze point is located along the intake pipe portion 132. In this way, the operator of the vehicle (100 in FIG. 1) is not prevented from refilling the reductant and enjoying the full performance of the engine (102 in FIG. 1).

Accordingly, an emission control system is provided that accords a vehicle improved cold weather performance compared to conventional emission control systems by reducing or eliminating intake pipe freezing.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system, comprising:
   a reductant reservoir having an intake pipe for receiving reductant;
   a heater for heating the reductant to provide heated reductant;
   a pump for pumping the heated reductant; and
   a conduit coupled to the pump and extending into the intake pipe providing the heated reductant into the intake pipe, wherein the conduit extends from within the reservoir, through an entry point of the intake pipe into the reservoir, and into the intake pipe to a location upstream of the entry point for melting any frozen reductant in the intake pipe.

2. The system of claim 1, further comprising an engine.

3. The system of claim 2, wherein the engine further comprises a diesel engine.

4. The system of claim 2, further comprising an exhaust system coupled to the engine.

5. The system of claim 4, further comprising an injector coupled to the exhaust system and the pump for injecting the heated reductant into the exhaust system.

6. The system of claim 5, further comprising a selective reduction catalyst positioned in the exhaust system downstream of the injector.

7. The system of claim 1, wherein the intake pipe includes a portion thereof extending into the reservoir.

8. The system of claim 7, wherein the portion of the intake pipe extending into the reservoir is perforated to facilitate reductant flow into the reservoir.

9. A vehicle, comprising:
   an engine;
   an exhaust system coupled to the engine;
   an injector for spraying reductant into the exhaust system;
   a catalyst positioned in the exhaust system downstream from the injector; and
   a reductant reservoir for storing the reductant and in fluid communication with the injector, comprising:
      an intake pipe for receiving reductant;
      a heater for heating the reductant to provide heated reductant;
      a pump providing the heated reductant to the injector; and
      a conduit coupled to the pump and extending into the intake pipe providing heated reductant into the intake pipe.

10. The vehicle of claim 9, wherein the conduit extends into the intake pipe above an entry point of the intake pipe into the reservoir for melting any frozen reductant in the intake pipe.

11. The vehicle of claim 9, wherein the intake pipe includes a portion thereof extending into the reservoir.

12. The vehicle of claim 11, wherein the portion of the intake pipe extending into the reservoir is perforated to facilitate reductant flow into the reservoir.

13. A method, comprising:
   heating reductant stored within a reservoir of a vehicle emission control system to provide heated reductant; and
   pumping the heated reductant through a conduit extending into an intake pipe of the reservoir; and
   pumping the heated reductant into the intake pipe of the reservoir to melt any frozen reductant in the intake pipe.

14. The method of claim 13, further comprising pumping the heated reductant into the intake pipe above an entry point of the intake pipe into the reservoir to melt any frozen reductant in the intake pipe.

15. The method of claim 13, further comprising pumping the heated reductant into the intake pipe above a perforated portion of the intake pipe to melt any frozen reductant in the intake pipe and facilitate flow of the reductant into the reservoir.

16. The method of claim 13, further comprising pumping the heated reductant into the emission control system of the engine.

17. The method of claim 16, further comprising pumping the heated reductant into an injector coupled to an exhaust system of the engine.

18. The method of claim 17, further comprising pumping the heated reductant into an injector coupled to an exhaust system of the engine and positioned between the engine and a selective reduction catalyst.

\* \* \* \* \*